COLOR DEMODULATOR

Filed Jan. 28, 1955 2 Sheets-Sheet 1

INVENTORS
DALTON H. PRITCHARD
ALFRED C. SCHROEDER
& WALTER G. GIBSON
BY
ATTORNEY

Feb. 16, 1960 D. H. PRITCHARD ET AL 2,925,462

COLOR DEMODULATOR

Filed Jan. 28, 1955 2 Sheets-Sheet 2

INVENTORS
DALTON H. PRITCHARD
ALFRED C. SCHROEDER
& WALTER G. GIBSON
BY
ATTORNEY

United States Patent Office 2,925,462

Patented Feb. 16, 1960

2,925,462

COLOR DEMODULATOR

Dalton H. Pritchard, Princeton, N.J., Alfred C. Schroeder, Huntingdon Valley, Pa., and Walter G. Gibson, Princeton, N.J., assignors to Radio Corporation of America, a corporation of Delaware Application January 28, 1955, Serial No. 484,802

3 Claims. (Cl. 178—5.4)

The present invention relates to improved color difference signal utilization in color television receivers.

The modern color television signal includes a luminance signal and a chrominance signal. The chrominance signal is a suppressed-carrier-modulated-subcarrier wherein for modulating signal bandwidth information from 0 to .6 mc. the chrominance signal includes a large gamut of color difference information signals, each located at a prescribed phase angle of the chrominance signal as referred to a reference phase angle. Each color difference information signal, when considered in combination with a corresponding luminance information signal describes the hue and saturation associated with a related color in the transmitted televised scene. In the modulating signal bandwith range from substantially 0.6 to 1.5 mcs., the chrominance signal includes the color difference information along the orange-cyan axis in the standard chromaticity diagram.

In one form of high color fidelity color television receiver, it is desired that color difference information signals be demodulated from the chrominance signal and combined in prescribed proportions and polarities along with the luminance signal to form red, green and blue information signals in the band from 0 to .6 mc. and substantially orange-cyan axis information signals in the band from 0.6 to 1.5 mcs. The choice of demodulated color difference information signals employed in the aforementioned signal combination will greatly influence the design and mode of operation and the color stability of the reproduction provided by the color television receiver.

It is an object of this invention to provide a simplified mode of operation for a color television receiver.

It is still another object of this invention to provide a means of utilizing color difference signal information in a color television receiver in a manner which yields high color fidelity reproduction of the transmitted color image.

It is a further object of this invention to provide a high color fidelity color television receiver system based on a mode of operation whereby improved simplification of circuit design and circuit alignment may be achieved.

According to the invention, a color television receiver employs a narrow band green-purple axis information signal in combination with any one of a wide gamut of color difference information signals other than the orange-cyan axis color difference information signal for the recovery of primary component color difference information signals which when combined with the luminance signal provides for full color fidelity reconstruction of the televised color image.

In one form of the invention a green-purple axis information signal and a red color difference information signal may both be demodulated and combined to provide color difference information signals describing red, green and blue color difference information in the frequency bandwidth from 0 to .6 mc., and, in addition, substantially orange-cyan axis color difference information in the frequency bandwidth from 0.6 to 1.5 mcs.

Other and incidental objects of this invention will become apparent upon a reading of the following specification and a study of the drawings wherein.

Figure 1:
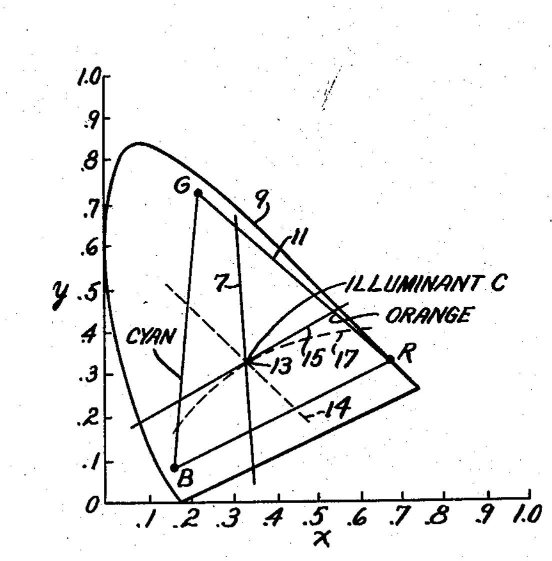
Figure 1 shows a chromaticity diagram.

Consider first the chromaticity diagram shown in Figure 1. The complete domain of all realizable colors is included within the horseshoe-shaped curve 9. The hue of a color is related to its dominent wave length. After selecting a standard white such as the white illuminant C13, the hue of any color can be expressed by the direction of the point representing that color from the white point on the chromaticity diagram. Similarly the saturation sensation given by any color is related to its purity, which is, in turn, represented by the distance along the radius from the white point to the point representing that color, measured as a fraction of the total distance out to the spectrum locus given by the horseshoe-shaped curve 9, along that same radius.

Chromaticity is fully given by just two numbers, namely, $x$ and $y$ as shown in Figure 1. It should be noted that lines on the chromaticity diagram do not have the properties of vectors. For a detailed description of the properties of the chromaticity diagram of the type shown in Figure 1, see, for example, the paper entitled, "Colorimetric Analysis of the RCA Color Television System," as published by D. W. Epstein in the June 1953 issue of the RCA Review.

The triangle 11 in Figure 1 shows the gamut of colors which can be reproduced by a color kinescope. Before continuing the description of the nature of the triangle 11 in Figure 1, consider first the signal bandwidths which are utilized in the color television system conforming to the present standards.

The luminance signal band has a total bandwidth of approximately 4.2 mcs. This describes a high definition luminance or monochrome signal made up of red, green and blue information to the proportions of 30%, 59% and 11% respectively.

There are included in the chrominance signal, color difference information signals denoted as I and Q signals which relate to color information along orange-cyan and green-purple axes respectively. The orange-cyan axis is shown by axis 15 in Figure 1 with the green-purple axis illustrated by axis 7. It is of interest that when information along the orange-cyan axis is to be reconstructed by a three-color image reproducer, then the orange-cyan axis follows more closely the dotted line 17 shown in Figure 1.

The chrominance signal is transmitted on a 3.58 mc. subcarrier which is suppressed during the transmission. Since the upper limit of the video band is substantially the same as that of the luminance band, namely, around 4.2 mcs., it follows that any sidebands in the suppressed-carrier-modulated-subcarrier must be restricted to a frequency band not extending to beyond 4.2 mcs. This then provides that any double sideband modulation of the subcarrier must be restricted to modulating components having a maximum frequency of approximately 0.6 mc. The subcarrier is therefore flanked by double sidebands for components up to 0.6 mc; the frequency band from approximately 2 to 3 mcs. in the chrominance signal is utilized to accommodate single sideband components representing orange-cyan color axis components having modulating frequencies from approximately 0.6 to 1.5 mcs.

The composite color television signal has the following characteristics:

A. Color detail, which produces significant signals of frequency less than 0.6 mcs. is accurately reproduced over the entire area enclosed by the triangle 11 in Figure 1.

B. Color detail, which produces significant signals of frequency greater than 0.6 mcs. and less than 1.5 mcs. is reproduced in hues which lie along the orange-cyan axis 15 or 17, depending upon the type of color image reproducer utilized.

C. Color detail which produces signals of frequency greater than 1.5 mcs. is reproduced in monochrome at the point representing illuminant C bearing the designator 13 in Figure 1.

The preceding tabulation may be generalized as follows: in regions of reduced detail, three-color information yields proper image representation. For regions of increasingly fine color detail, the human eye is satisfied with what is substantially two-color representation; two-color representation is optimally chosen along that axis for which the eye has greatest acuity, namely, the orange-cyan axis. For finest detail, only luminance information need be transmitted.

The chrominance signal consists of a suppressed-carrier color difference information signal modulated subcarrier. Utilizing techniques described, for example, by Gloystein and Turner in their article entitled, "The Colorplexer—a Device for Multiplexing Color Television Signals in Accordance with the NTSC Specifications," as published in the January 1954 issue of the Proceedings of the I.R.E., the subcarrier, which has a frequency of 3.58 mcs., is modulated to provide the chrominance signal which may be described by the vector diagram shown in Figure 2. In this vector diagram which describes the continuous change of hue which is contained in the chrominance signal, the phase angle yields the indication of hue, while the sub-carrier amplitude, when considered along with the corresponding luminance level, gives an indication of saturation. White or neutral colors fall at the center of the diagram since these produce no subcarrier components. Any given color or color difference information signal, then corresponds to an axis or line on this vector diagram.

Figure 2:
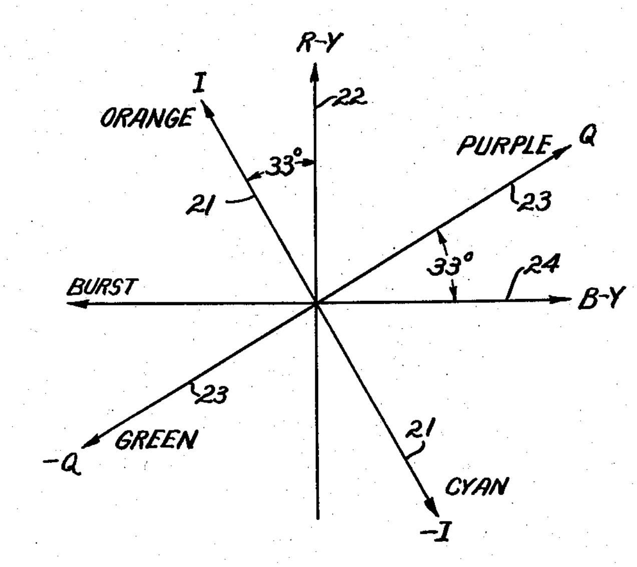
Figure 2 shows a vector diagram illustrating the color difference information signals included in a chrominance signal.

Since the chrominance signal is susceptible to demodulation by the processes of synchronous demodulation, a color synchronizing burst is included on the back porch of each horizontal synchronizing pulse; the color synchronizing bursts convey the reference phase information corresponding to the burst phase shown in Figure. 2.

It is seen in Figure 2 that the I and —I signals 21 which describe the orange and cyan color difference information respectively are disposed in phase whereby the phase of the I signal lags the burst phase by 57°. The Q and —Q signals 23 which describe the purple and green color difference information respectively are disposed in phase whereby the phase of the Q signal lags the I signal by 90°. The phase of the $R-Y$ color difference information signal 22 is seen to lag the burst phase by 90°. A synchronous detector devised to explore a prescribed phase shown in Figure 2 will also explore the phase, 180° out of phase with respect to that prescribed phase—though yielding the corresponding color difference signal in reversed polarity; it will be realized therefore that further reference in the specification to color difference information signals of the —I, —Q and $-(R-Y)$ variety is unnecessary in that it is understood hereinafter that reference to a Q signal or to an $R-Y$ color difference information signal, for example, also implies the demodulation of —Q and $-(R-Y)$ color difference signal by the synchronous demodulator of these signals.

According to the present invention, there is one gamut of color difference information signals, to be described in detail, which will yield color television image reproduction wherein the higher frequency color information in the range from substantially 0.6 to 1.5 mcs. is fully and accurately reproduced. By selecting the Q signal and one or more color difference information signals from this gamut for forming the component color information signals containing the aforementioned high frequency color information, rather than by restricting the selection to only I and Q signals, simplification of circuit design and improvement in circuit performance as derived from the nature and characteristics of the color difference information signals chosen may be realized. For example, when Q and $R-Y$ color difference information signals are utilized, the following is true: (*a*) In color hold circuits of the type which utilize, for example, phase discriminators for frequency control in conjunction with a reactance tube of a local oscillator for producing the reference subcarrier, the phase of the color oscillator can be optimally caused to fall in synchronism at a phase 90° removed from that of the color synchronizing burst. This phase corresponds to the $R-Y$ color difference information signal phase. If the $R-Y$ color difference information signal is one of the pair of color difference information signals utilized for the production of component color signals describing the color television image, it then follows that at least one of the phases of the required synchronous demodulating signals is therefore automatically developed. (*b*) The recovery of the $R-Y$, $B-Y$ and $G-Y$ color difference signals from any pair of demodulated color difference information signals depends largely upon the accuracy and maintenance of tolerances of each of the associated circuits which are utilized for matrixing the demodulated color difference information signals. Should a circuit parameter change in magnitude due to heating or prolonged use, or should the replacement of a tube provide into the circuit a new tube of slightly different characteristics, then the color difference information signal provided by the matrixing of the demodulated color difference information signals may constitute a considerable departure from the desired $R-Y$, $B-Y$ and $G-Y$ color difference information signals in both the low frequency and higher frequency color difference information signal ranges. If, for example, one of the demodulated color difference information signals is one of the three desired color difference information signals required for the reconstruction of the color image, say the $R-Y$ color difference information signal, it follows then that this one of the three desired color difference information signals will always be accurately produced in a manner relatively independent of circuit parameters; in addition, the matrixing of one accurately produced color difference information signal with a second color difference information signal may be utilized to produce others of the three desired color difference information signals with improved accuracy. (*c*) If one of the demodulated color difference information signals is, for example, chosen to be the $R-Y$ color difference information signal, the accuracy of waveform of this color difference information signal may be easily checked by adding a sufficient amount of luminance signal to the $R-Y$ color difference information signal to provide the recovery of a component red information signal which may be then compared with the red content in an appropriate region of the color image.

Numerous experiments by the present inventors have shown that if either the I or Q signals is to be utilized with a second color difference information signal for matrixing to provide recovery of high definition component color information signals, the Q signal component is the more desirable component for providing orange-cyan axis information in the higher frequency color range. When the Q signal component was chosen as one of the two demodulated color difference information signals it was found that one of a very large gamut of color difference information signals in a phase range from the vicinity of the burst phase to a phase between the $R-Y$ and Q phases could be utilized as the second of the two demodulated color difference information signals. The utilization of the Q signal and any one of the aforementioned gamut yielded a high fidelity color television image wherein orange-cyan axis color reproduction was realized in the higher frequency color signal ranges from ½ to 1½ mcs. When the I signal was chosen as one color difference information signal component, it was found that the choice of any second or auxiliary color difference information signal which differed from the Q signal, led to a deterioration of the reconstructed color image.

It can be shown mathematically that in general, lines of constant Q on the chromaticity diagram are generally parallel to the orange-cyan or I axis while lines of constant I are generally parallel to the green-purple or Q axis. A line of constant I or Q may be defined as that line which constitutes a locus of points for which I or Q is held constant over a bandwidth from 0.6 to 1.5 mcs. It follows, therefore, that the Q signal has the phase which is critical for providing accurate higher frequency color reproduction.

An auxiliary understanding of the teachings of the present invention can also be achieved in a general sense by realizing that the blue color information is transmitted at very low levels; therefore, the channel which is employed in the color television receiver to furnish the component blue information signal to the color image reproducer must be of considerably higher gain than those channels, which, for example, furnish the component green information signals. It then follows that if other than blue information finds its way into the blue channel due to the inability of a matrix to provide accurate color information at the higher color frequencies, this improper and spurious color information will be amplified to a high level and reproduced by the color image reproducer.

Figure 3:
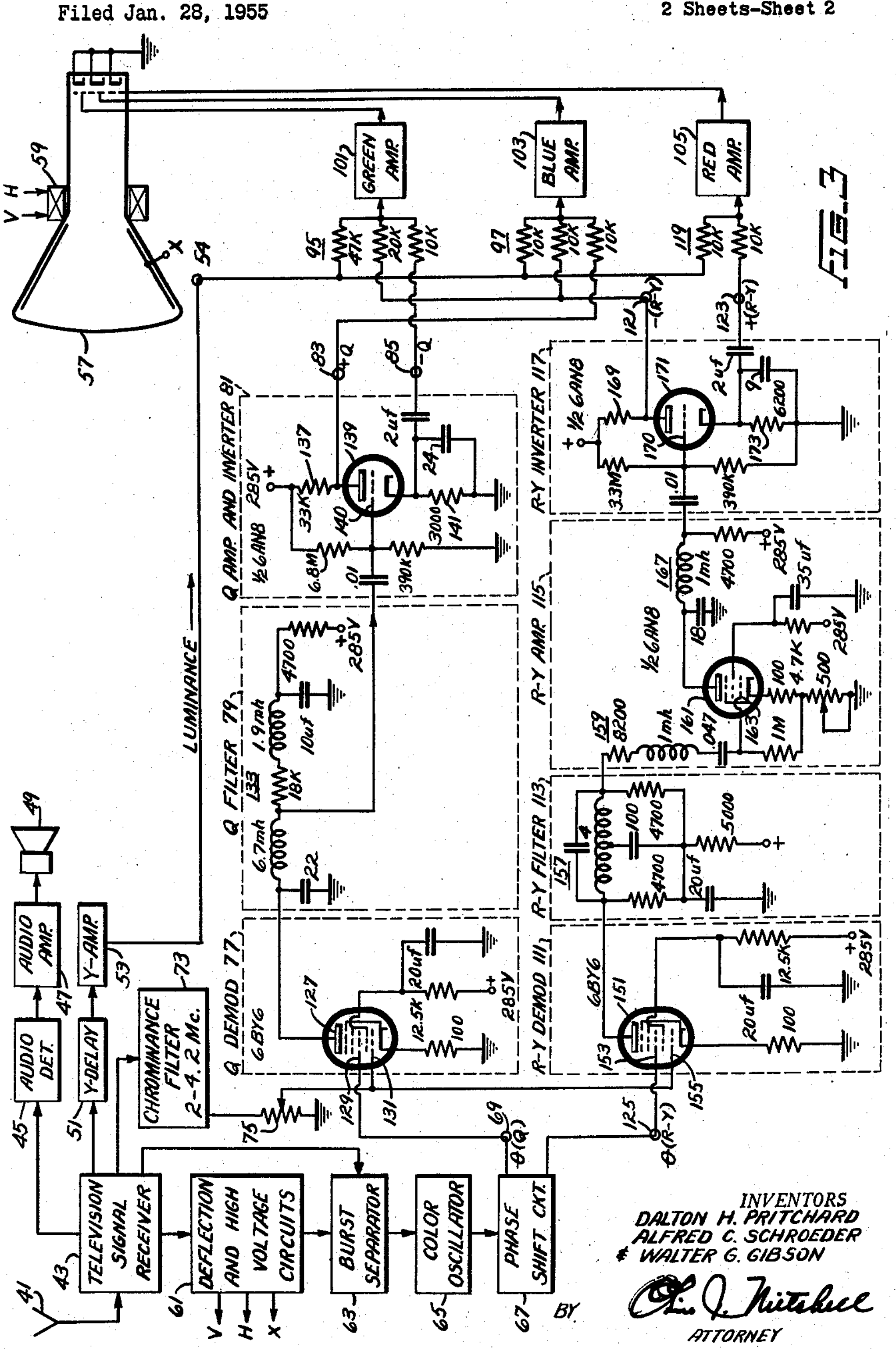
Figure 3 shows a diagram of a color television receiver which utilizes demodulated green-purple axis and red color difference information signals to provide the reconstruction of the transmitted color image.

Figure 3 is a diagram of a color television receiver which operates following the teachings of the present invention. One of the two demodulated color signals employed is the Q signal. The second color difference information signal is the $R-Y$ color difference information signal.

The incoming color television signal arrives at the antenna 41 and is applied to the television signal amplifier 43. In the television signal receiver 43 numerous functions are provided, namely first detection, intermediate frequency amplification, second detection, and automatic gain control. The operation of the television signal receiver has been described in detail, for example, by Antony Wright in his article entitled, "Television Receivers," published in the RCA Review for March 1947. It is to be understood that the operation of a television signal receiver does not constitute a particular function of the present invention in that its function is only to demodulate and provide a recovered color television signal which may then be employed in the luminance, chrominance and synchronizing channels in a manner which conforms to the teachings of the present invention.

Utilizing, for example, the well known principles of intercarrier sound, the sound information is recovered from the color television signal, detected in the audio detector 45, amplified in the audio amplifier 47, and applied to the loud speaker 49.

The recovered color television signal is utilized principally in four branches to provide the signals which may be employed for reconstruction of the televised color image by the color image reproducer 57.

One branch provides the recovered color television signal in the form of the luminance signal through the Y delay line 51 wherefrom it is applied to the Y amplifier 53. The amplified luminance signal is then provided at the terminal 54 and simultaneously applied to the resistor matrices 95, 97 and 119.

The recovered color television signal is also applied to the deflection and high voltage circuits 61 which separate the picture synchronizing signals from the picture information, and supply appropriate deflection signals to the yoke 59. In addition, gate pulses 62 having substantially the duration of at least the color synchronizing bursts and occurring in time coincidence with the color synchronizing bursts, are also generated. The gate pulses 62 are then applied to the burst separator 63 to which the recovered color television signal is also applied. The burst separator 63 consists of a gate circuit which, due to the action of the gate pulses 62, separates the color synchronizing bursts from the color television signal and applies these color synchronizing bursts to the color oscillator 65 wherein a reference subcarrier signal having a frequency of 3.58 mcs. and a phase prescribed by the color synchronizing bursts is produced. The reference subcarrier is then applied from the color oscillator 65 to the phase shift circuit 67 wherefrom a pair of demodulating signals is caused to appear at the output terminals 69 and 125. The synchronous demodulating signals appearing at the output terminals 69 and 125 are adjusted to the phases of the Q and $R-Y$ color difference information signals according to the phase relationships shown in Figure 2.

The color television signal is applied to the chrominance filter 73 which has a pass band from substantially 2 to 4.2 mcs. The filtering action provided by the chrominance filter 73 eliminates at least the luminance information below 2 mcs. and provides what is substantially a chrominance signal which is now in a condition for synchronous demodulation of the Q and $R-Y$ signals.

Consider the operation of the Q demodulator 77. The Q phase synchronous demodulating signal is applied to the control grid 129 at the same time that the chrominance signal is supplied by the potentiometer 75 to the control grid 131 of the electron tube 127. Synchronous demodulation of the Q signal is thereby furnished in the Q demodulator 77 with this Q signal filtered in the Q filter 79. The Q filter 79 consists of the low pass filter 133 having circuit constants which provide a pass band from 0 to 0.6 mc. and a mode of coupling which couples the filter Q signal to the control grid 140 of the electron tube 139. The electron tube 139 is the control device of the Q amplifier and inverter 81, having an output plate resistor 137 and an output cathode resistor 141 thereby providing a +Q signal to the output terminal 83 and a −Q signal to the output terminal 85.

The phase shift circuit 67 is adjusted to provide an $R-Y$ phase synchronous demodulating signal to the output terminal 125 from which terminal it is applied to the second control grid 153 of the electron tube 151. The chrominance signal is coupled from the potentiometer 75 to the control grid 155. Synchronous demodulation thereby takes place within the electron tube 151 which forms the demodulating device of the $R-Y$ demodulator 111; the demodulated $R-Y$ color difference information signal is applied to the bridged-T-filter 157 which forms the filter element of the R—Y filter 113. The bridged-T-filter 157 is designed to have a pass band from 0 to 1.5 mcs. and also to have phase delay which matches the phase delay of the Q filter 79. The filtered $R-Y$ color difference information signal is then passed through the coupling circuit 159 onto the control grid 163 of the electron tube 161. The output of the electron tube 161 is then coupled to the control grid 170 of the electron tube 171 which forms the control device of the $R-Y$ inverter 117. The electron tube 171 has a plate output resistor 169 and cathode output resistor 173 so coupled as to provide a $-(R-Y)$ color difference information signal to the output terminal 121 and a $+(R-Y)$ color difference information signal to the output terminal 123.

Since the $+(R-Y)$ color difference information signal is one of the three component color difference information signals required for use with the luminance or Y signal, the $R-Y$ color difference information signal and the luminance signal are added together directly in the resistance matrix 119 and applied to the red amplifier 105.

$B-Y$ and $G-Y$ color difference information signals can be formed from appropriate combination of $R-Y$ and Q color difference information signals according to the relationships given by the following equations:

$$R-Y=R-Y \quad (1)$$

$$B-Y=2.44\,Q-1.17\,(R-Y) \quad (2)$$

$$G-Y=-.455\,Q-.295\,(R-Y) \quad (3)$$

By performing the process of matrixing according to the Equations 2 and 3 in the matrices 97 and 95 respectively, in conjunction with proper amounts of luminance signal, blue and green component color signals are provided to the blue and green amplifiers 103 and 101 respectively. The outputs of these amplifiers are then used to drive the color image reproducer 57.

The use of the $R-Y$ color difference information signal in conjunction with the Q signal in the circuit shown in Figure 3 has the advantage that the $R-Y$ color difference information signal is one of the color difference information signals which is utilized for final recovery of the televised color image. In addition, since flesh tone and orange-cyan edge effects are highly dependent upon the $R-Y$ color difference information, it is to the advantage of the color television receiver design that the $R-Y$ color difference information signal be provided immediately by one of the pair of color difference signal demodulators.

While the use of the $R-Y$ and the Q color difference information signals for image reconstruction, has the obvious advantage already described in these specifications, in other forms of the invention, a variety of auxiliary color difference information signals utilized in conjunction with the Q signal may be employed for obtaining optimum edge color reproduction lying in the range between the I signal and the burst phase. It is to be understood, of course, that each choice of color difference information signal pairs entails the design of a specific matrix which will provide both low frequency color difference information signals and reproduction of the edge color reproduction along substantially the orange-cyan axis.

Having described the invention, what is claimed is:

1. In a color television receiver, the combination of, a source of a chrominance signal including a Q signal and an $R-Y$ color difference information signal in a first frequency range and orange-cyan axis information in at least a second frequency range, said Q signal and said $R-Y$ color difference information signal having phases in said chrominance signal lagging a reference phase by 147° and 90°, respectively, a circuit to provide intermittent color synchronizing bursts each having a phase related to said reference phase, means coupled to said burst providing circuit to develop a first oscillatory signal having a phase corresponding to the phase of said Q signal in said chrominance signal and a second oscillatory signal having a phase corresponding to the phase of said $R-Y$ color difference information signal in said chrominance signal, a first demodulating means coupled to said source and operatively connected to be responsive to said first oscillatory signal for demodulating a Q signal from said chrominance signal, a second demodulating means coupled to said source and operatively connected to be responsive to said second oscillatory signal for demodulating a second color difference information signal at the phase of said $R-Y$ color difference information signal from said chrominance signal, said second color difference information signal having a frequency band which includes both said first frequency range and said second frequency range, circuit means for combining selected magnitudes and polarities of each of said Q signal and said second color difference information signal to develop color difference information signals corresponding to red, green and blue color difference information signals in said first frequency range and orange-cyan axis information in said second frequency range.

2. In a color television receiver, the combination of, a source of color television signals representing a color image and including a luminance signal, and a chrominance signal which includes information describing a gamut of color difference signals including a wide bandwidth I signal describing orange-cyan axis information and a narrow bandwidth Q signal which describes green-purple axis information, said I and Q signals included in said chrominance signal at phases lagging a reference phase by 57° and 147°, respectively, said color television signal also including color synchronizing bursts having said reference phase, means to separate said color synchronizing bursts from said color television signals, means coupled to said burst separator means and responsive to said separated bursts to develop an oscillation which is synchronized to a phase prescribed by said separated bursts, means coupled to said source and operatively connected to be responsive to a first phase of said oscillation developed by said oscillation developing means for demodulating said Q signal, means coupled to said source and operatively connected to be responsive to a second phase of said oscillations provided by said oscillation developing means for demodulating a second color difference signal at other than a phase lagging the reference phase by 57° and containing at least a prescribed portion of orange-cyan axis information, means for combining selected magnitudes and polarities of said Q signal and said second color difference information signal to form a prescribed trio of color difference signals which also describe the orange-cyan axis information over the wide bandwidth of said I signal.

3. In a color television receiver, the combination of, a source of color television signals representing a color image and including a luminance signal and a chrominance signal including signal information describing a gamut of color difference signals including an $R-Y$ color difference information signal and a Q signal in a first frequency range, and orange-cyan axis information in a second frequency range, said $R-Y$ color difference information signal and said Q signal in said first frequency range having phases lagging a reference phase by 90° and 147°, respectively, said color television signal also including color synchronizing bursts having said reference phase, means to separate said color synchronizing bursts from said color television signal, means coupled to said burst separator means and responsive to said separated bursts to develop an oscillation having a phase synchronized by said separated bursts to a phase related to said reference phase, means to develop from said oscillation a first demodulating signal having a phase corresponding to said Q signal in said chrominance signal, means to develop from said oscillation a second demodulating signal having a phase corresponding to said $R-Y$ signal in said chrominance signal, means coupled to said source and to said first demodulating signal developing means for demodulating said Q signal, means coupled to said source and to said second demodulating signal developing means for demodulating an $R-Y$ color difference signal which also includes higher frequency components in said second frequency range which describe orange-cyan axis information, circuit means for combining selected amplitudes and polarities of said Q signal and said $R-Y$ color difference information signal to form a prescribed trio of color difference signals which also describe color information along an orange-cyan axis in said second frequency range.

References Cited in the file of this patent

UNITED STATES PATENTS

| | | |
|---|---|---|
| 2,713,607 | Rhodes | July 19, 1955 |
| 2,725,422 | Stark et al. | Nov. 29, 1955 |
| 2,732,425 | Pritchard | Jan. 24, 1956 |
| 2,840,634 | Bedford | June 24, 1958 |